(12) United States Patent
Chen et al.

(10) Patent No.: US 11,483,018 B1
(45) Date of Patent: Oct. 25, 2022

(54) RECONFIGURABLE AND SCALABLE NONLINEAR FILTER FOR DIGITAL PRE-DISTORTERS

(71) Applicant: XILINX, INC., San Jose, CA (US)

(72) Inventors: Xiaohan Chen, Sunnyvale, CA (US); Hemang M. Parekh, San Jose, CA (US); John Edward McGrath, Tipperary (IE); Hongzhi Zhao, Los Gatos, CA (US); David Eugene Melinn, Dublin (IE)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/339,241

(22) Filed: Jun. 4, 2021

(51) Int. Cl.
*H04B 1/04* (2006.01)

(52) U.S. Cl.
CPC ..... *H04B 1/0475* (2013.01); *H04B 2001/045* (2013.01)

(58) Field of Classification Search
CPC . H04B 1/0475; H04B 10/58; H04B 2001/045
USPC ......................................... 375/295–297, 350
See application file for complete search history.

(56) References Cited

U.S. PATENT DOCUMENTS

| | | | | |
|---|---|---|---|---|
| 5,898,338 A * | 4/1999 | Proctor | ................. | H03F 1/3229 330/149 |
| 6,985,033 B1 * | 1/2006 | Shirali | ................. | H03F 1/3247 330/149 |
| 7,737,779 B2 | 6/2010 | Summerfield et al. | | |
| 9,014,241 B2 | 4/2015 | Dick | | |
| 9,455,760 B1 | 9/2016 | Dick et al. | | |
| 10,622,951 B1 | 4/2020 | Chen et al. | | |
| 11,133,854 B1 * | 9/2021 | Pratt | ....................... | H04B 17/15 |
| 2007/0296494 A1 * | 12/2007 | Hongo | ................... | H03F 1/3282 330/149 |
| 2008/0129379 A1 * | 6/2008 | Copeland | ............... | H03F 1/3241 330/149 |
| 2010/0046958 A1 * | 2/2010 | Awadalla | .......... | H04B 10/25137 398/149 |
| 2010/0225390 A1 * | 9/2010 | Brown | ....................... | H03F 1/26 330/149 |
| 2015/0061773 A1 * | 3/2015 | Shi | .......................... | H03F 1/3247 330/291 |
| 2015/0311671 A1 * | 10/2015 | Bhullar | ................. | H04B 10/504 372/38.02 |
| 2017/0338842 A1 * | 11/2017 | Pratt | ...................... | H03F 1/3247 |
| 2021/0194521 A1 * | 6/2021 | Pratt | ...................... | H03F 1/3247 |

* cited by examiner

*Primary Examiner* — Emmanuel Bayard
(74) *Attorney, Agent, or Firm* — Patterson + Sheridan, LLP

(57) ABSTRACT

Examples described herein provide a radio frequency circuit. The radio frequency circuit includes a controller; a parameter estimator circuit; a capture circuit; and a pre-distorter circuit. The pre-distorter generally includes one or more nonlinear filter circuits and configurable hardware circuitry. Each of the one or more the nonlinear filter circuits includes: adder(s); multiplier(s); and memories coupled to at least one of the adder(s) and the multiplier(s); where the configurable hardware circuitry is configured to distort one or more input signals by directing the one or more input signals along a path through the one or more adders, the one or more multipliers, and the one or more memories and by distorting the one or input signals using the nonlinear parameters stored in the one or more memories as the one or more input signals travels the path.

20 Claims, 11 Drawing Sheets

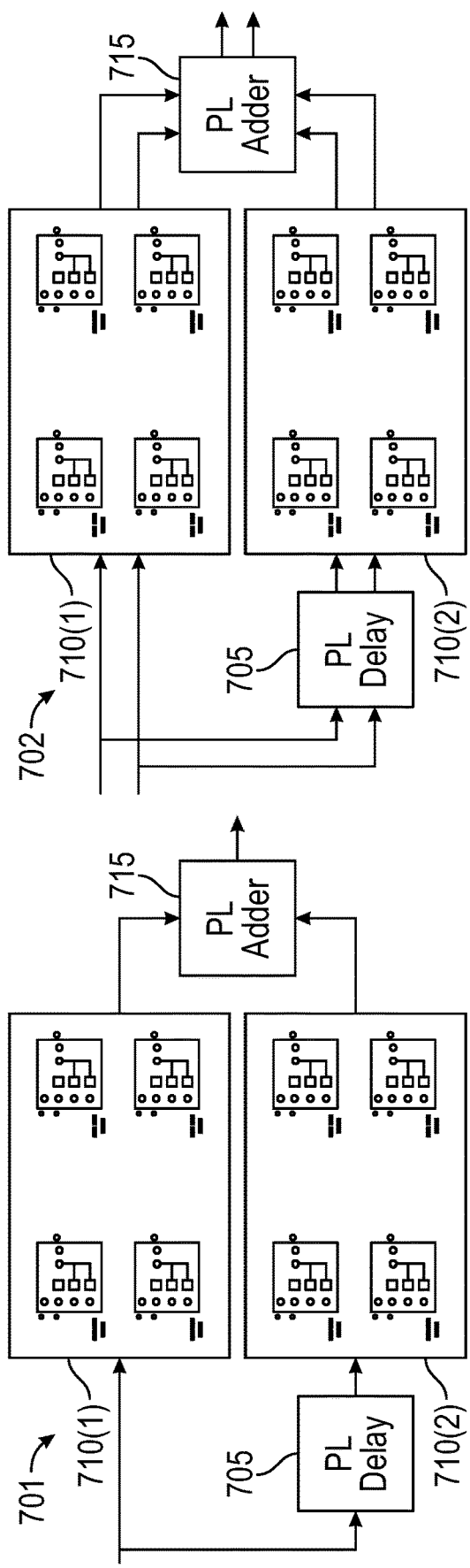
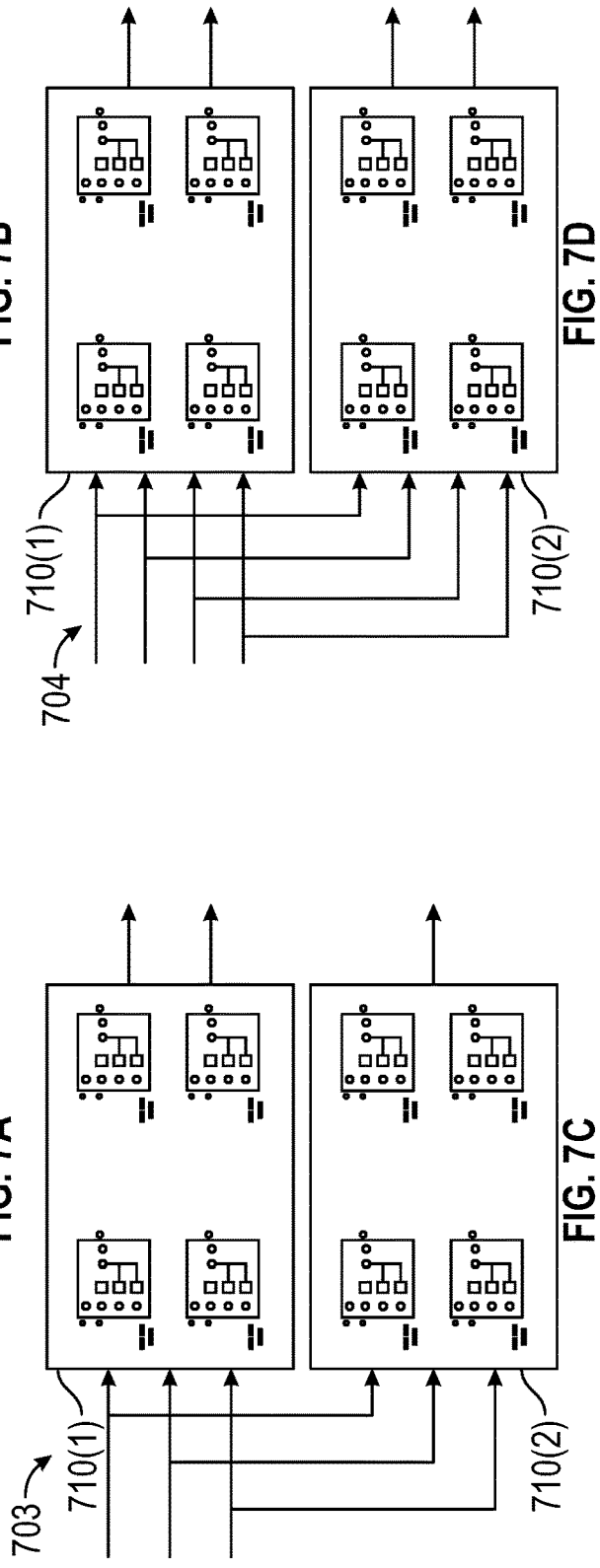
FIG. 7A  FIG. 7B  FIG. 7C  FIG. 7D

RECONFIGURABLE AND SCALABLE NONLINEAR FILTER FOR DIGITAL PRE-DISTORTERS

TECHNICAL FIELD

Examples of the present disclosure generally relate to digital pre-distorters and, in particular, to nonlinear filters for digital pre-distorters.

BACKGROUND

One of the most costly sub-systems in a wireless communication device is the radio frequency (RF) processing chain. The most costly component in the RF processing chain is the power amplifier. To reduce the cost of a transmitter, equipment manufacturers focus on using low-cost power amplifiers. However, low-cost power amplifiers are inherently non-linear. The waveforms of conventional wireless communication protocols that are to be processed by the power amplifier ideally require a linear transfer function to both minimize spectral emissions, via spectral re-growth mechanisms to a neighbor spectrum, and to also control the amount of in-band distortion that is generated by a non-linear transfer function. In order to correct the distortions introduced by the nonlinear transfer function, digital pre-distortion procession can improve the linearity in an RF processing chain.

In some wireless systems, the RF processing chain may be used with different applications, such as Macro, DAS (Distributed Antenna Systems), mMIMO. Each application has different power levels, number of antennas and signal bandwidth, and other requirements. Because of the varying requirements between applications, the requirements for digital pre-distortion processing differ and thus affect the configuration of a pre-distorter in an RF processing chain.

Digital pre-distorters (DPDs) are important to digital frontend (DFE) designs to improve the efficiency of RF lineup including power amplifiers. Generally, DPDs include non-linear filters implemented using block random access memory and digital signal processors (DSP), which are acceptable forms for broad range of DSP implementation. However, block random access memory and DSPs, including multiply-accumulator units, use a lot of die space and power, compared to application specific implementation.

Accordingly, circuit designs for improving non-linear filters to reduce power consumption without sacrificing flexibility is needed.

SUMMARY

These and other aspects may be understood with reference to the following detailed description. One example is a nonlinear filter circuit of a pre-distortion circuit, the nonlinear filter comprising: one or more adders; one or more multipliers; one or more memories coupled to at least one of the one or more adders and the one or more multipliers, wherein the one or more memories stores nonlinear parameters; and configurable hardware circuitry configured to distort one or more input signals by directing the one or more input signals along a path through the one or more adders, the one or more multipliers, and the one or more memories and by distorting the one or input signals using the nonlinear parameters stored in the one or more memories as the one or more input signals travels the path.

Another example is a radio frequency circuit, comprising a controller; a parameter estimator circuit; a capture circuit; and a pre-distorter circuit, the pre-distorter comprising one or more nonlinear filter circuits and configurable hardware circuitry, each of the one or more the nonlinear filter circuits comprising: one or more adders; one or more multipliers; and one or more memories coupled to at least one of the one or more adders and the one or more multipliers. The configurable hardware circuitry is configured to distort one or more input signals by directing the one or more input signals along a path through the one or more adders, the one or more multipliers, and the one or more memories and by distorting the one or input signals using the nonlinear parameters stored in the one or more memories as the one or more input signals travels the path.

Another example is a nonlinear filter of a pre-distorter circuit, comprising configurable hardware circuitry; and one or more nonlinear filter circuits. Each of the one or more the nonlinear filter circuits comprises one or more adders; one or more multipliers; and one or more memories coupled to at least one of the one or more adders and the one or more multipliers, wherein the one or more memories stores nonlinear parameters. The configurable hardware circuitry is configured to direct one or more input signals to the one or more adders, the one or more multipliers, and the one or more memories and the configurable hardware circuitry is configured to distort one or more input signals by directing the one or more input signals along a path through the one or more adders, the one or more multipliers, and the one or more memories and by distorting the one or input signals using the nonlinear parameters stored in the one or more memories as the one or more input signals travels the path.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 7A-7D are diagrams of example arrangements of non-linear filters, according to one example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
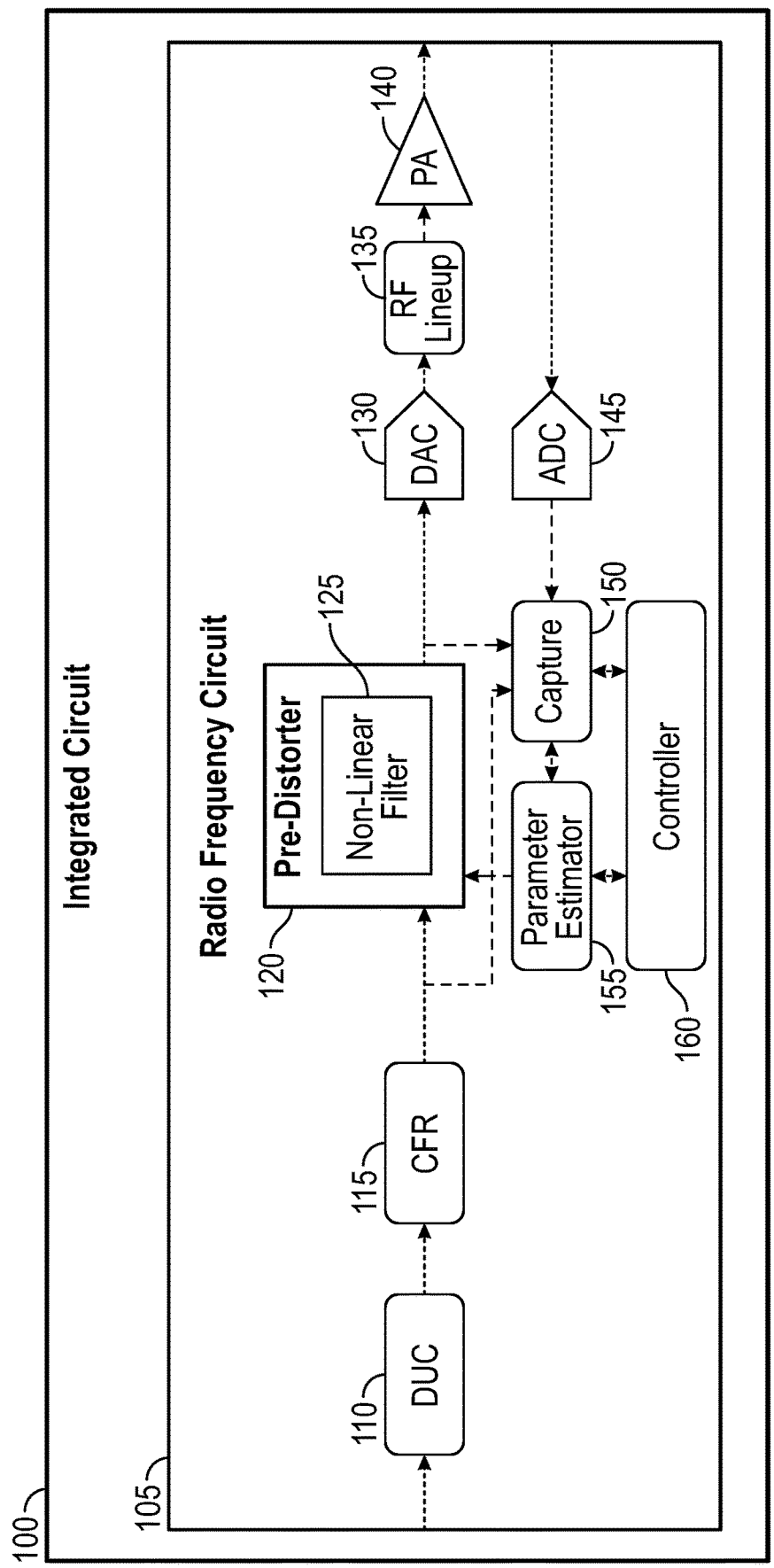
FIG. 1 is a schematic diagram of a transmission circuit with a pre-distorter, according to one example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe a reconfigurable and scalable nonlinear filter for digital pre-distorters (DPDs). Specifically, the nonlinear filter includes programmable hardened circuitry and configurable hardware circuitry (e.g., programmable logic or multiplexers/switches). Because the nonlinear filter includes both hardened circuitry and configurable circuitry, the nonlinear filters can be used in a wide range of applications. The nonlinear filters described herein combines power savings with programmability for both wired and wireless applications. The nonlinear filters described herein reduce power consumption by DPDs without sacrificing flexibility. The nonlinear filters described herein allow construction of a variety of DPD circuits and other signal processing circuits for further flexibility in support of different digital front-end (DFE) requirements. Additionally, the nonlinear filters provide a DFE application with denser and higher computing for DPDs and other linear and nonlinear circuits using nonlinear filters.

FIG. 1 illustrates an example integrated circuit 100 with a radio frequency (RF) circuit 105, according to one example. The integrated circuit 100 can include multiple RF circuits, and the RF circuit 105 can be an RF circuit disposed on the integrated circuit 100. The integrated circuit 100 can also include other circuitry for supporting wireless communication and for supporting the RF circuit 105.

The RF circuit 105 is configured to transmit signals from a processor (not illustrated). The RF circuit 105 can be a part of a transceiver or a communication network and can be implemented in a wireless communication device. The RF circuit 105 includes a digital up converter (DUC) circuit 110, a crest factor reduction (CFR) circuit 115, a pre-distorter circuit 120, a digital-to-analog (DAC) converter 130, a RF lineup circuit 135, and a power amplifier 140. The RF circuit 105 also includes an analog-to-digital converter (ADC) circuit 145, a sample capture circuit 150, a parameter estimator circuit 155, and a controller circuit 160.

The DUC circuit 110 converts an input signal to the appropriate digital format and the CFR circuit 115 helps reduce the peak-to-peak average power ratio. For example, a baseband signal can be converted to an intermediate frequency signal. The output of the DUC circuit 110 and CFR circuit 115 is applied to a digital pre-distorter circuit 120, the output of which is coupled to a DAC 130 and to a sample capture circuit 150. The DAC circuit 130 generates analog radio frequency signals from the digitally formatted input signals and sends the analog RF signals to an RF lineup circuit 135, and the RF lineup circuit 135 sends the RF signals to a power amplifier 140.

As a part of a feedback mechanism, the RF circuit 105 includes circuit components that provide feedback on the signal being transmitted. In such feedback loop, the ADC circuit 145 receives RF signals generated by the power amplifier 140, and the sample capture circuit 150 receives an output from the ADC circuit 145 and from the CFR circuit 115. The feedback look involves the ADC circuit 145, the sample capture circuit 150, the parameter estimator circuit 155, the controller circuit 160, and the pre-distorter circuit 120. The feedback loop involves examining the signal outputted by the power amplifier 140 and determining whether the parameters used by the pre-distorter circuit 120 needs to be changed or updated. In some examples, the feedback loop that includes the pre-distorter circuit 120 can adjust the input signal based on the signal outputted from the power amplifier 140.

The controller 160 is coupled to the capture circuit 150 and to a parameter estimator circuit 155. The controller circuit 160 controls the sample capture circuit 150 to ensure that the correct parameters (via the parameter estimator circuit 155) are provided to the pre-distorter circuit 120 in real time. For example, the controller circuit 160 ensures that the received samples are brought into alignment with the transmitted samples with respect to frequency time, and amplitude. In addition to the amplitude of the signals being aligned, any delay between the two signals will be eliminated to ensure that the samples are aligned in time. That is, because of the time required to pass through the power amplifier 140 will cause the signals to be out of alignment, it is necessary to adjust the alignment of the signals coupled to the sample capture circuit 150. The delay aligned signal can be offset in frequency to ensure that the frequencies of the signal are the same. This processing can be a part of a set of functions in the software running on the controller circuit 160. The processing can be done in real time as they are received or after they are stored.

The capture circuit 150, as mentioned, is coupled to the output of the CFR circuit 115, the output of the pre-distorter circuit 120, and the output of the ADC 145. The capture circuit 150 is figured to capture and store the output of the CFR circuit 115, the output of the pre-distorter circuit 120, and the output of the ADC 145. By capture and storing the output of the ADC 145, the capture circuit 150 is capturing and storing the output of the power amplifier 140. The captured output of the power amplifier can then be used by the controller circuit 160 and the parameter estimator circuit 155 for determining whether parameters for the pre-distorter circuit 120 needs to be updated or changed. In some examples, the controller circuit 160 configures the sample capture circuit 150 to sample the output of the ADC 145, and can configure the sample capture circuit 150 as needed to determine parameters for the pre-distorter circuit 120.

The parameter estimator circuit 155 is configured to generate parameters for the pre-distorter circuit 120 based on samples captured at the output of the CFR circuit 115, at the output of the pre-distorter circuit 120, and at the output of the power amplifier 140 (after being converted via the ADC 145). The controller circuit 160 can determine if and which samples from the sample capture circuit 150 are required for generating parameters by the parameter estimator circuit 155. The parameters can be coefficients of a transfer function, for example, which modify the input signal so that the output of the pre-distorter circuit 120 offsets the distortion of the power amplifier 140.

The new generated parameters are stored in a parameter buffer (not illustrated) in the parameter estimator circuit 155 for use by the pre-distorter circuit 120. There are a number of possible numerical techniques for generating the parameters. Discrete characterization events, where the coefficients are found that best match the PA during some period of L samples duration, can be employed. By way of example, Least Mean Squares estimation over the fixed block of L samples can be used. However, any other method known in the art for generating parameters by the parameter estimator circuit 155 for a pre-distorter circuit 120 can be used.

The pre-distorter circuit 120 is configured to receive an input signal and generate an output signal which comprises a modified version of the input signal. As mentioned previously, the pre-distorter circuit 120 modifies the input signal to compensate for distortion in the power amplifier such that the output of the power amplifier 140 correlates to the input signal. The characterization event for generating parameters by the parameter estimator circuit 155 to apply to the pre-distorter circuit 120 begins with a capture of a predetermined number L of samples of data from the input and output of the power amplifier 140. The samples of the input of the power amplifier 140 are taken from the output of the pre-distorter circuit 120. Accordingly, the output of the pre-distorter circuit 120 and the output of the power amplifier 140 are coupled to sample capture circuit 150.

According to some examples, digital pre-distortion involves performing the operations on a digital signal prior to digital-to-analog conversion. The samples from the output of a power amplifier (e.g., power amplifier 140) are typically obtained via some analog circuitry followed by an ADC (e.g., ADC 145). A trigger provided to the sample capture circuit 150 enables the storing of the outputs of the pre-distorter circuit 120 and the power amplifier 140 based upon a detected power value for the input signal.

The pre-distorter circuit 120 is configured to alter the signal provided to the power amplifier 140 such that the output of the power amplifier 140 is the desired signal. That is, the non-linearity introduced by the power amplifier 140 alters the intentionally distorted input signal based upon predetermined parameters in such a way that the output of the power amplifier 140 is the correct signal.

According to some examples, the pre-distorter circuit 120 includes a nonlinear filter 125. The nonlinear filter 125 is configured to receive the input signal from the CFR 115 and intentionally distort the input signal before outputting the distorted signal.

In some examples, the nonlinear filter 125 can utilize the following equation to represent the nonlinearity of the input signal to the pre-distorter circuit 120:

$$y_{GMP}(n) = \sum_{p=0}^{P} \sum_{m=0}^{M} \sum_{l=0}^{L} a_{mlp} x(n-l) |x(n-m)|^P$$

The output $y_{GMP}(n)$ of the above equation is applied to time-aligned input signal samples, and has a nonlinear order and memory depth of M and L, respectively. The term $a_{mlp}$ is coefficients of the aligned terms between signal and its model, respectively. The function $|x|$ is the magnitude of input signal and P is the polynomial order. The above equation can be applied to most input signals, and can distort the input signal going to the power amplifier 140 such that the output signal from the power amplifier 140 resembles the input signal into the pre-distorter circuit 120. The above equation includes even and odd polynomial terms, and in some examples, the equation can be used to consider subset terms of the above polynomial equation.

In some examples, cross terms and aliases of the above polynomial equation effect handling terms. Some examples facilitate the pre-distorter circuit 120 with handling nonlinearities with lower sampling rate, different feedback ADC configuration, higher instantaneous bandwidth (BW), harmonics effects of the power amplifier 140, and final coupling effects of the power amplifier 140, multi-path transmission coupling effects, and more.

The nonlinear filter 125 of the pre-distorter circuit 120 can include memory or storage which allows for a compact representation of all orders of nonlinearity for each term (x, $x^2$, $x^3$, $x^4$, . . . , $x^{15}$, etc.) of a polynomial equation used to add distortion to the input signal to the pre-distorter circuit 120. In some examples, the memory of the nonlinear filter 125 includes lookup tables (LUT) and these LUTs include nonlinearity terms having different orders of nonlinearity. The nonlinearity terms in the LUTS may correspond to the parameters estimated by the parameter estimator circuit 155 for adding distorting to the input signal. In some examples, the memory of the nonlinear filter 125 may include hardened circuitry.

Figure 2A:
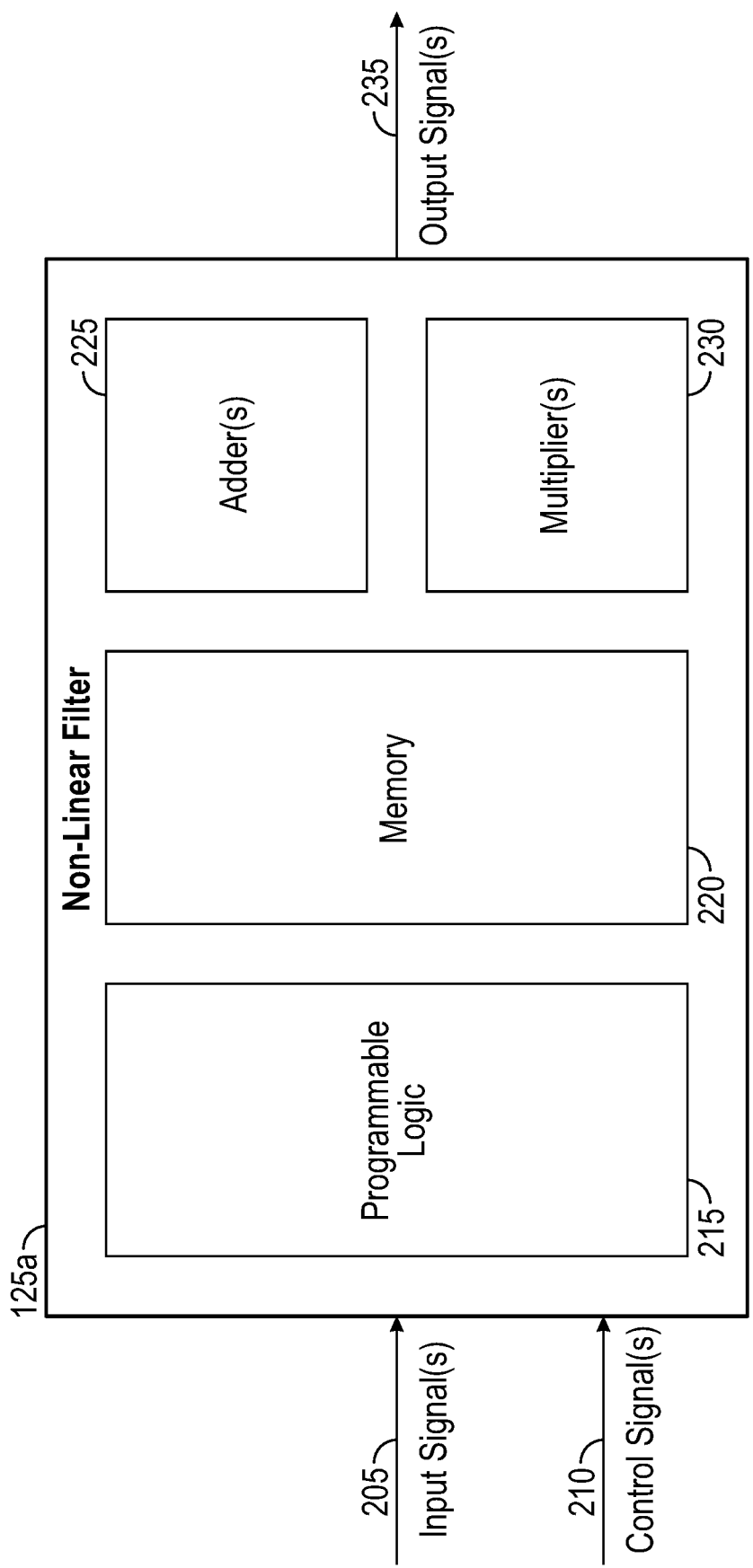
FIGS. 2A and 2B are schematic diagrams of nonlinear filters used with a pre-distorter, according to some examples.
Figure 2B:
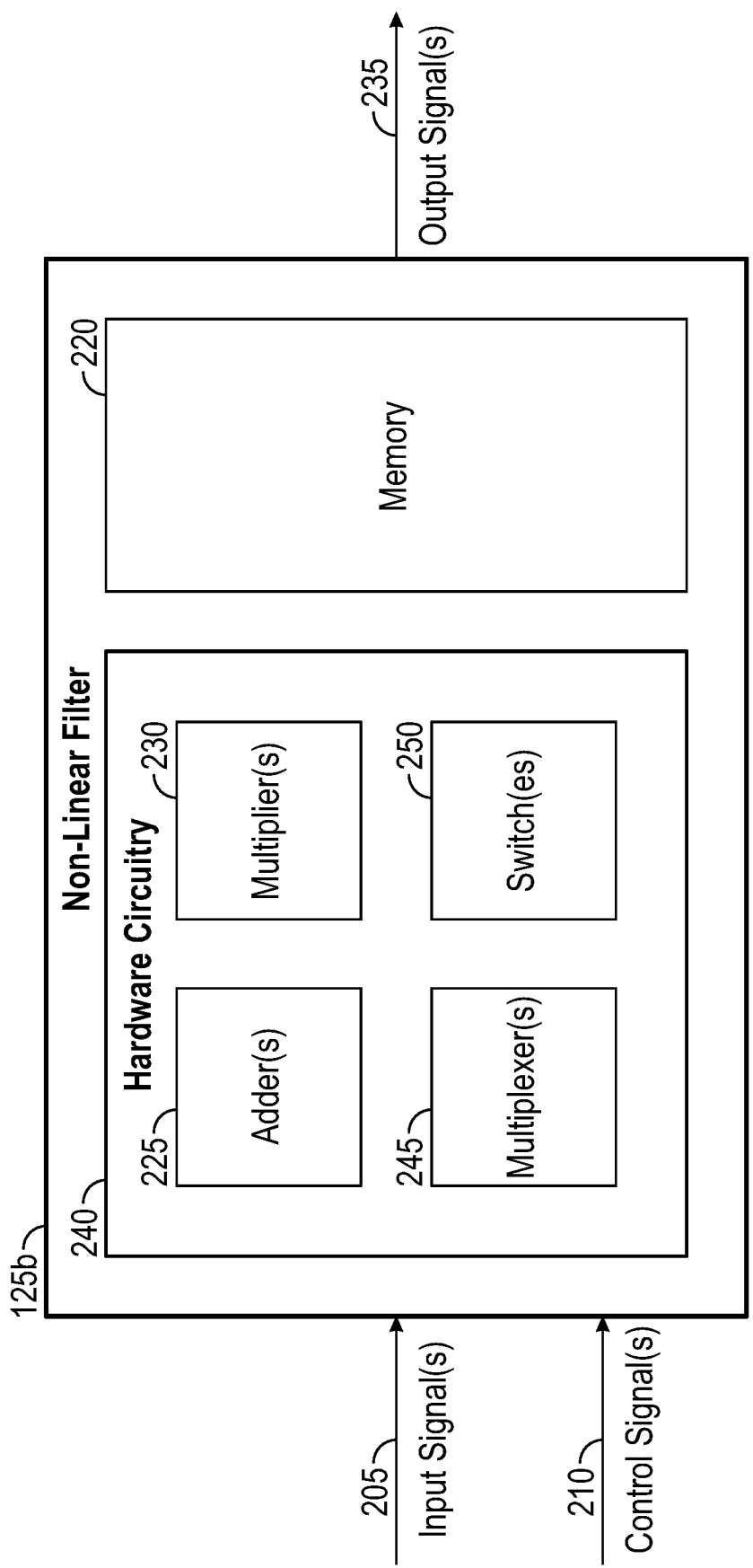

FIGS. 2A and 2B are diagrams illustrating example nonlinear filters that can be used as a part of a pre-distorter circuit (e.g., pre-distorter circuit 120 of FIG. 1), according to one example. In some examples, as illustrated in FIG. 2A, the nonlinear filter 120*a* includes programmable logic 215, memory 220, an adder 225, and a multiplier 230. In such examples, the nonlinear filter 125*a* can include any number of adders 225 and any number of multipliers 230. The programmable logic 215 can be configured to implement any number or any nonlinearity terms as needed to apply distortion to the input signal. In some examples, the components of the nonlinear filter, such as the memory 220, the adder 225, and the multiplier 230, are hardened circuitry, and the programmable logic 215 can be used to configured to connect the components of the nonlinear filter as needed based on the end application of the pre-distorter circuit.

In other examples, instead of using programmable logic, FIG. 2B illustrates a non-linear filter 125*b* that provides programmability using multiplexers 245 and switches 250 (e.g., hardened circuitry). The nonlinear filter 125*b* includes hardware circuitry 240 and memory 220, and the hardware circuitry 240 includes an adder 225, a multiplier 230, a multiplexer 245, and a switch 250. In such examples, the nonlinear filter 125*a* can include any number of adders 225, any number of multipliers 230, any number of multiplexers 245, and any number of switches 250. The hardware circuitry 240 can also include other circuit components for implementing nonlinearity terms.

For the nonlinear filters 125*a* and 125*b* illustrated in both FIGS. 2A and 2B, the nonlinear filters 125*a* and 125*b* can be implemented as multiple smaller nonlinear filter circuits. These smaller nonlinear filter circuits can have multiple configurations, and can be coupled in different circuit configurations. Each of these smaller nonlinear filter circuits includes memory 220, one or more adders 225, and one or more multipliers 230. In some examples, the smaller nonlinear filter circuits may be reconfigurable to meet requirements of different end applications (e.g., different base station architectures). The requirements for different end applications can include parameters for the nonlinear filter and the nonlinear filter circuits, such as power levels, number of antennas, and signal bandwidth, specific to the different end applications.

Figure 3A:
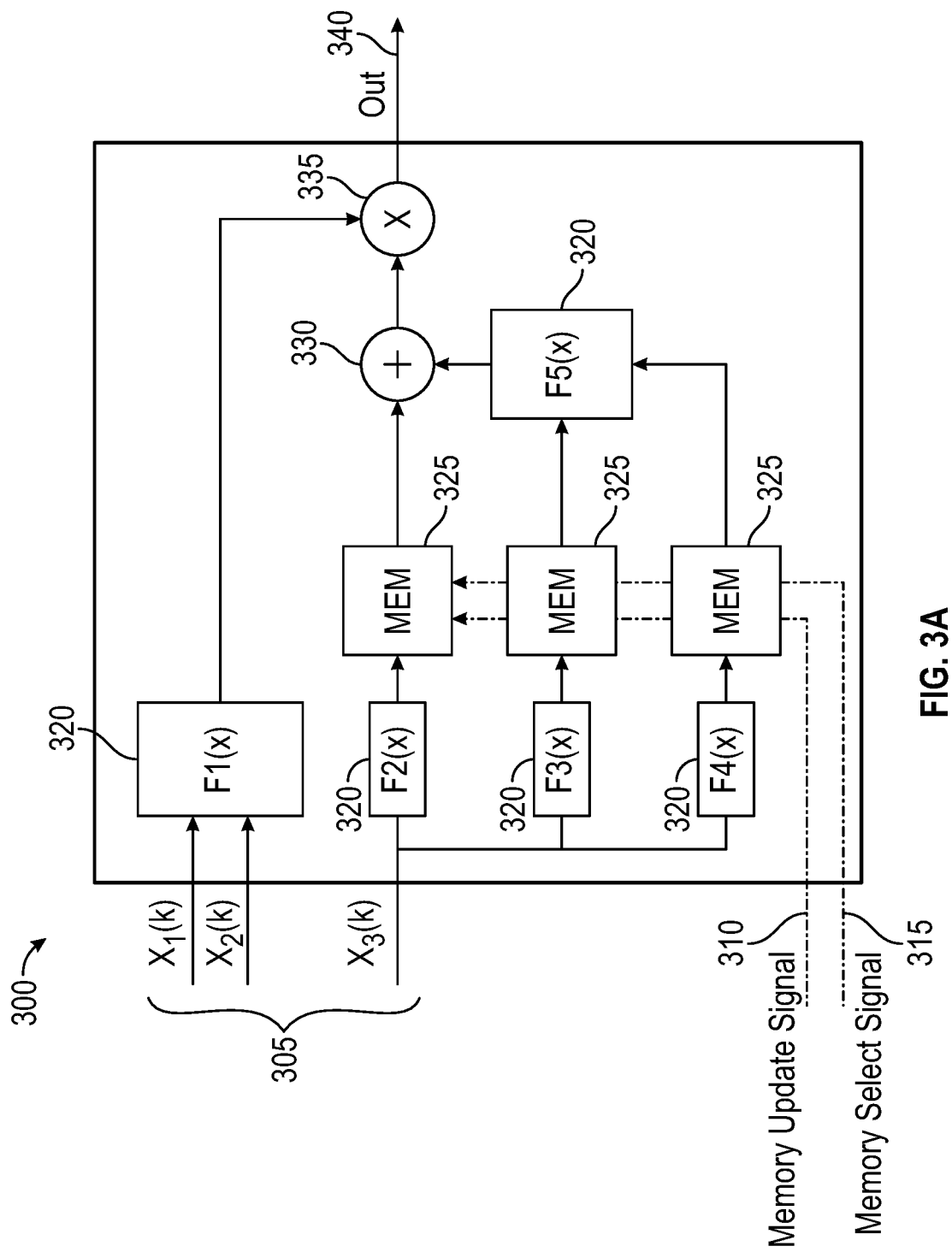
FIGS. 3A and 3B are schematic diagrams of example nonlinear filter circuits of a nonlinear filter, according to some examples.
Figure 3B:
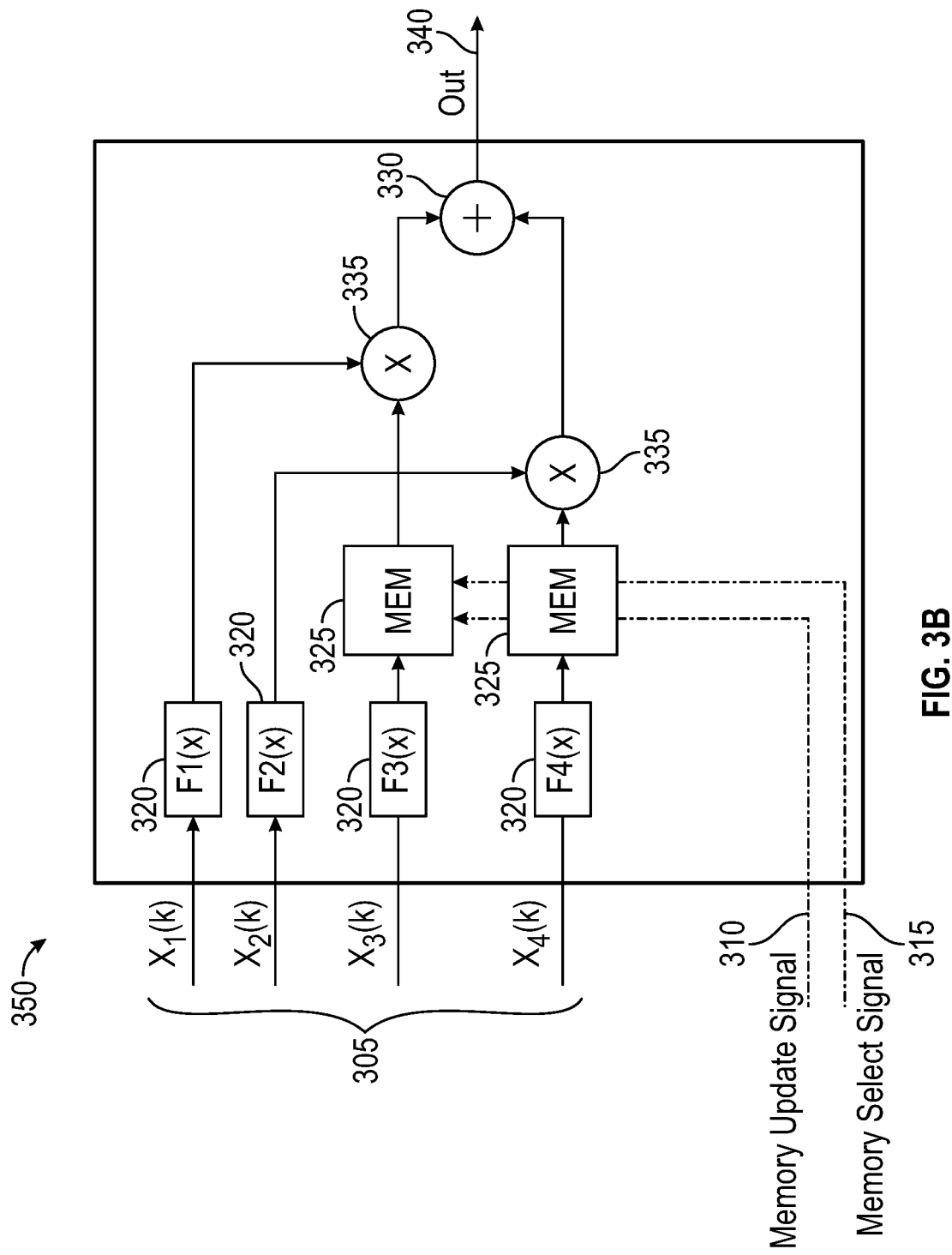

FIGS. 3A and 3B are diagrams of examples of these smaller nonlinear filter circuits that can be implemented in the nonlinear filters 125 of FIGS. 2A and 2B, according to some examples. As mentioned, the nonlinear filter circuits 300, 350 (of FIGS. 3A and 3B respectively) include memory 325, one or more adders 330, and one or more multipliers 335. In some examples, the nonlinear filter circuits 300, 350 comprise hardened circuitry, and configurable hardware circuitry (e.g., programmable logic) can be used to between the nonlinear filter circuits to connect the nonlinear circuits 300, 350 in different arrangement as needed based on the end application of the pre-distorter circuit.

The nonlinear filter circuits 300 and 350 receive input signals 305, including an input data signal (e.g., $x_1(k)$, $x_2(k)$, $x_3(k)$) and memory input signals. The input data signal 305 is the data signal received by the pre-distorter circuit (e.g., pre-distorter circuit 120 of FIG. 1), in which the nonlinear filters 300 and 350 are disposed, and the data signal to be distorted for output by the power amplifier 140. The memory input signals include a memory update signal 310 and a memory select signal 315. The memory update signal 310 can include updated information (e.g., updated parameters to be used for distorting the input data signal 305) to be stored in the memory 325, and the memory select signal 315 can be used to indicate in which of the memory 325 the updated information is to be stored.

When the input data signals 305 are received, the input data signals 305 can be sent to circuitry 320 that implement functions. The circuitry 320 can be implemented as programmable logic (e.g., programmable logic 215 of FIG. 2A) or as hardware circuitry via switches and/or multiplexers (e.g., hardware circuitry 240 of FIG. 2B via multiplexers 245 and switches 250). These functions can include delay functions and complex operations, such as multiplication, absolute value function, and angle functions. The output of the function-implementing circuitry 320 then goes to the memory 325 of the nonlinear filter circuits 300 and 350.

The memory 325 of the nonlinear filter circuits 300 and 350 receives the output of the function-implementing circuitry 320 and outputs nonlinear terms that correspond to the output of the function-implementing circuitry 320. The outputted nonlinear terms can depend on the inputs from the circuitry 320 implementing functions. The memory 325 includes lookup tables (LUTs) that store the nonlinear terms. Each LUT in the memory 325 can support different memory depths.

The terms outputted by the memory 325 are then sent to a combination of the adders 330 and the multipliers 335. In some examples, the terms outputted by the memory 325 can go to additional function-implementing circuitry 320 before going to the adders 330 and multipliers 335. The adders 330 and the multipliers 335 can be combined in any arrangement. In some examples, the inputs to the adders 330 and to the multipliers 335 can be added via the adders 330 then multiplied via the multipliers, or can be multiplied by the multipliers 335 then added together via the adders 330. The order and/or combination of adders 330 and multipliers 335 depends on the terms of a generalized memory polynomial (GMP) equation (e.g., the above polynomial equation), and can be arranged without wasting resources. The ratio of multipliers 335 and adders 330 compared to memory 325 can be different, and can depend on the GMP equation implemented by the nonlinear filter circuit.

Figure 4:
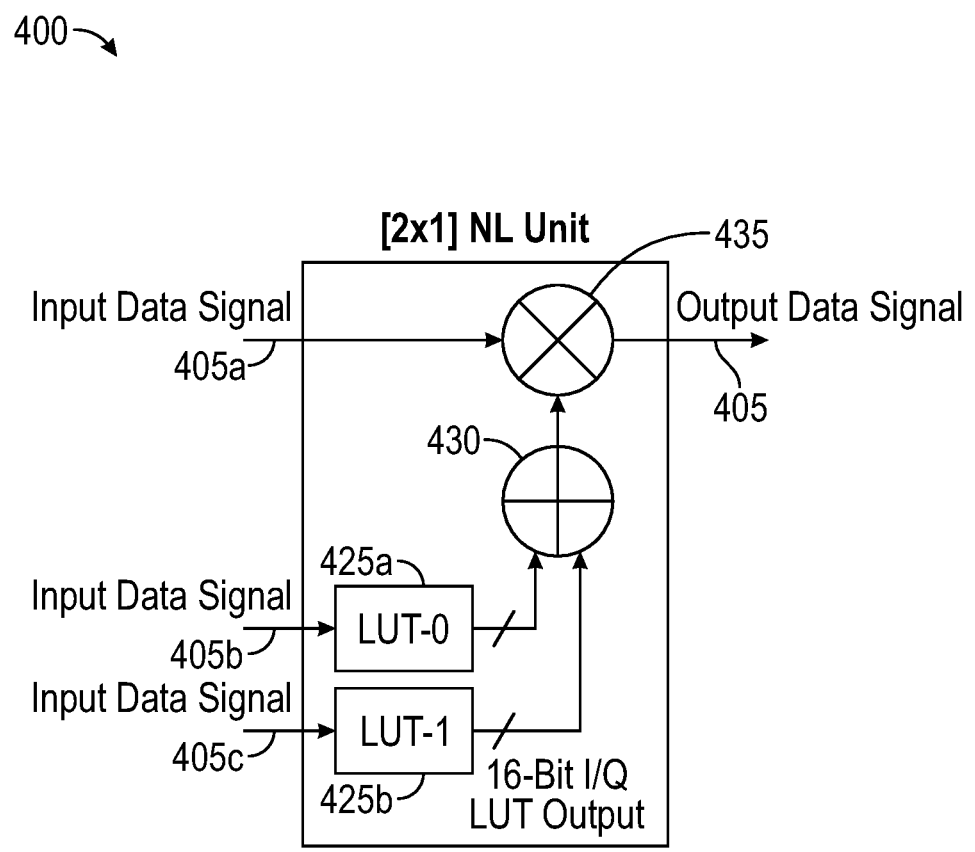
FIG. 4 is a diagram of an example nonlinear filter circuit of a nonlinear filter, according to one example.

FIG. 4 is a diagram illustrating an example nonlinear filter circuit to be disposed in a nonlinear filter, according to some examples. The nonlinear filter circuit 400, like the nonlinear filter circuits 300 and 350 of FIGS. 3A and 3B, includes memory with LUTs 425a and 425b, an adder 430, and a multiplier 435.

According to some examples, the nonlinear filter circuit 400 performs the operation based on the following equation:

$$y(n) = \sum_{u=0}^{15} x(n - m_{u,\cdot}) \cdot [LUT_{u,0}(index_u(n - k_{u,0})) + LUT_{u,1}(index_u(n - k_{u,1}))]$$

The nonlinear filter circuit 400 involves a multiplier 435 applied to an input I/O (in-phase and quadrature) signal and to the sum of two LUT outputs. The adder 430 can select to either output the output of a single LUT or the sum of both LUTs.

The LUTs of the nonlinear filter circuit 400 can perform LUT indexing, involving delayed versions of signal modulus and/or delayed version of programmable logic (PL) index input. The LUTs 425a, 425b of the nonlinear filter circuit 400 can implement dual buffering and handle 256 16-bit I/O words in dual buffers. The LUTs 425a, 425b can be selectable from the programmable logic 215 of FIG. 2A or from the hardware circuitry 240 of FIG. 2B. The contents of the LUT 425a, 425b can be reloadable from the programmable logic 215 of FIG. 2B or from the hardware circuitry 240 of FIG. 2B, at a sequential reload rate up to 500 MHz.

Figure 5A:
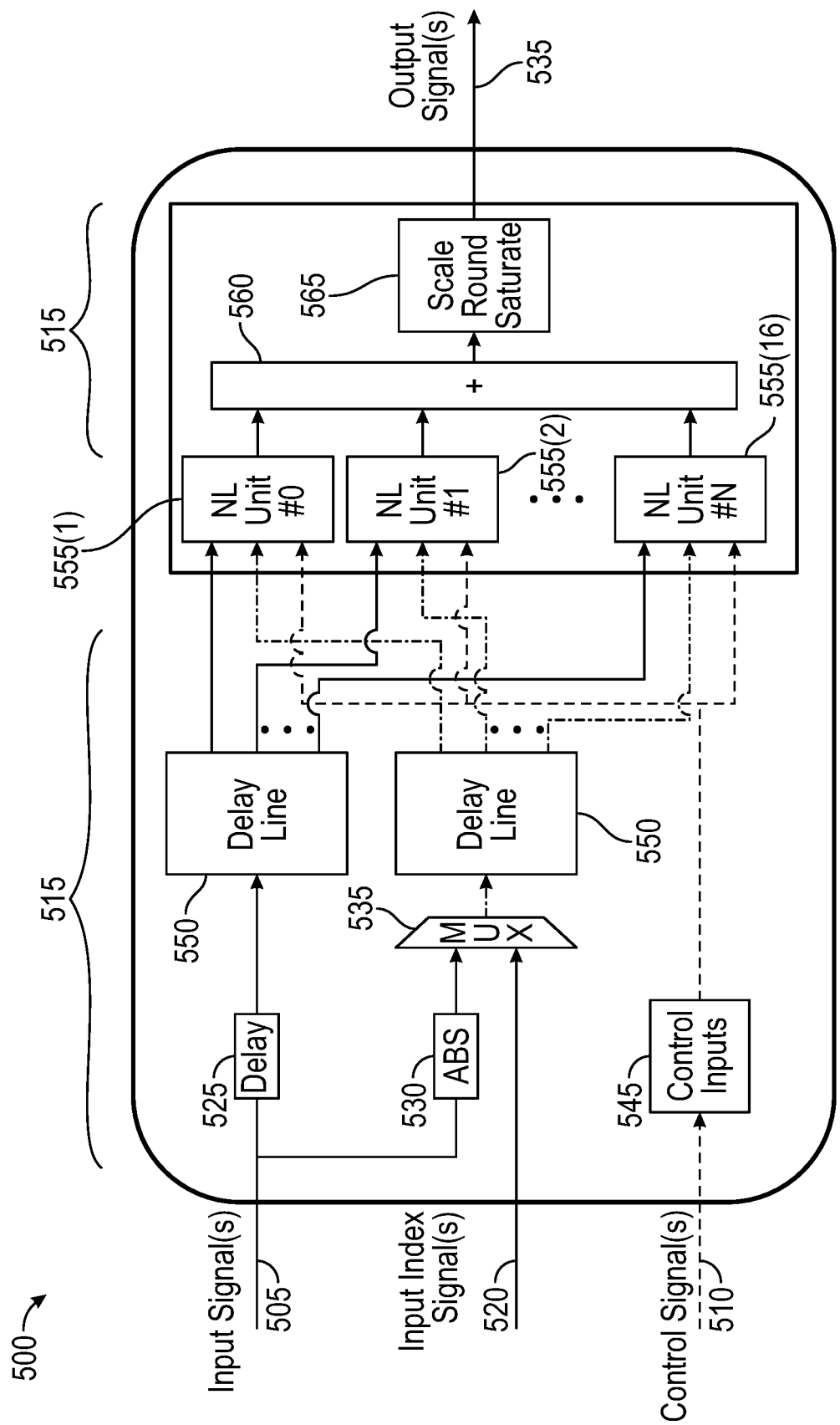
FIGS. 5A and 5B are diagrams of example non-linear filters used with a pre-distorter, according to one example.
Figure 5B:
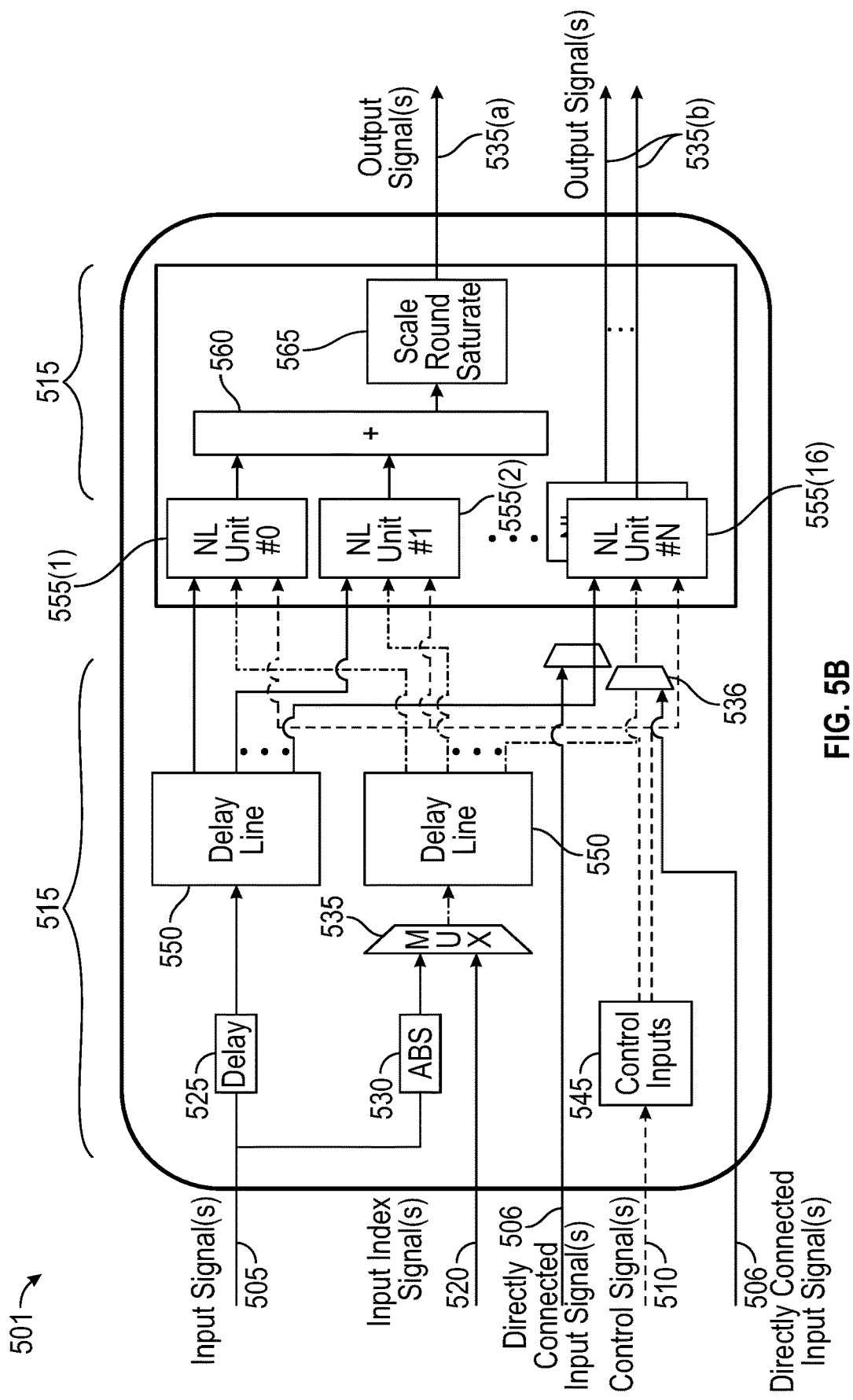

FIGS. 5A and 5B are diagrams of example nonlinear filters having multiple nonlinear filters circuits, such as the nonlinear filter circuit 400 of FIG. 4, according to some examples. The nonlinear filters 500, 501 of FIGS. 5A and 5B include memory, circuitry 515 via hardware circuitry and/or programmable logic, like the nonlinear filters 125a and 125b of FIGS. 2A and 2B, and shows a more detailed arrangement of the features of the nonlinear filters. As mentioned, the circuitry 515 via hardware circuitry includes multiplexers, like the multiplexers 535, 536 shown in FIGS. 5A and 5B, and can include switches (not illustrated), multipliers (not illustrated), and adders 560. In some examples, instead of hardware circuitry, the nonlinear filters 500, 501 include function-implementing circuitry 515 via programmable logic that perform similar functions as the hardware circuitry. Generally, the nonlinear filters 500, 501 include either programmable logic and/or hardware circuitry configured to implement the functions discussed with regards to FIGS. 3A and 3B and other functions.

As illustrated in FIGS. 5A and 5B, the nonlinear filters 500, 501 include circuitry that implements a delay 525 of the input signal, circuitry that implements an absolute function 530 of the input signal, a multiplexer 535, control input circuitry 545 to configure and/or store the control signals, and circuitry that implements 16-tap delay lines 550. The circuitry of the nonlinear filters 500, 501 can be coupled together and/or other components of the nonlinear filters 500, 501.

Each of the nonlinear filters 500, 501 includes multiple nonlinear filter circuits 555(1), 555(2), . . . 555(16) (collectively referred to nonlinear filter circuits 555). The nonlinear filters 500, 501 can have any number of nonlinear filter circuits 555. For example, the nonlinear filters 500, 501 can have 16 nonlinear filter circuits 555 coupled to the programmable logic or hardware circuitry. These nonlinear filter circuits 555 can be the nonlinear filter circuit 300 in FIG. 3A, the nonlinear filter circuit 350 in FIG. 3B, the nonlinear filter circuit 400 in FIG. 4, or other arrangements as described herein. The nonlinear filter circuits 555 receive inputs from various circuit components of the nonlinear filters 500, 501, such as circuitry to configure and/or store the control signals as control inputs 545, and circuitry that implements 16 tap delay lines 550, and outputs resulting in signals to an adder 560. The adder 560, in turn, sends the summed output of the nonlinear filter circuits 555 to a circuit for scaling, rounding, and/or saturation before being output as an output signal of the nonlinear filters 500, 501.

In some examples, as illustrated in FIG. 5B, the nonlinear circuits 555 can be arranged for mixed modes of connectivity. For example, one mode of connectivity involves directly outputting the results of the nonlinear filter circuits 555, and another mode of connectivity involves processing the results of the nonlinear filter circuits 555 and then outputting the processed results. Accordingly, the nonlinear circuits 555 directly output the results from the nonlinear filter circuits 555 as additional output signals in addition to the results processed by the adder 560 and the scale/round/saturate circuit 565. In such examples, the nonlinear filter circuit 555 can include additional circuit components, such as multiplexers, and additional input signal, such as a direct connectivity signal that indicates to the nonlinear filter 500, 501 to output the results of one or more nonlinear filter circuits 555. As noted previously, the circuitry of the nonlinear filter 500, 501 can be arranged and/or configured in order to implement a nonlinear function that distorts the input signal to compensate for the distortion caused by the power amplifier (e.g., power amplifier 140).

Figure 6A:
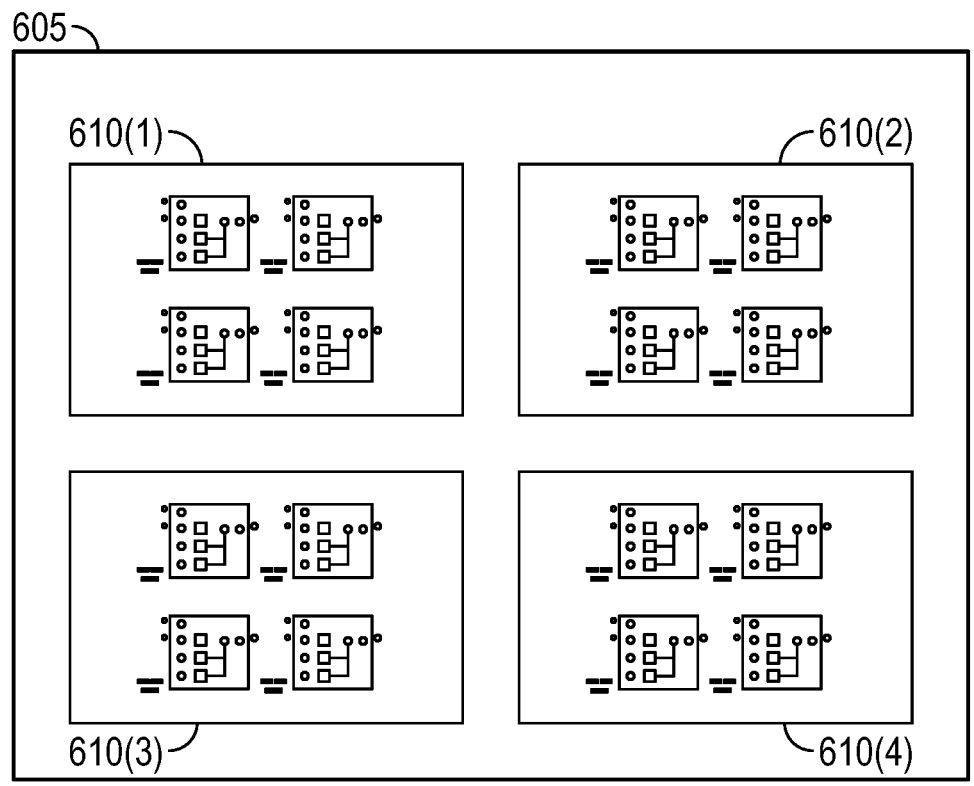
FIGS. 6A and 6B are diagrams of example arrangements of multiple non-linear filters, according to some examples.
Figure 6B:
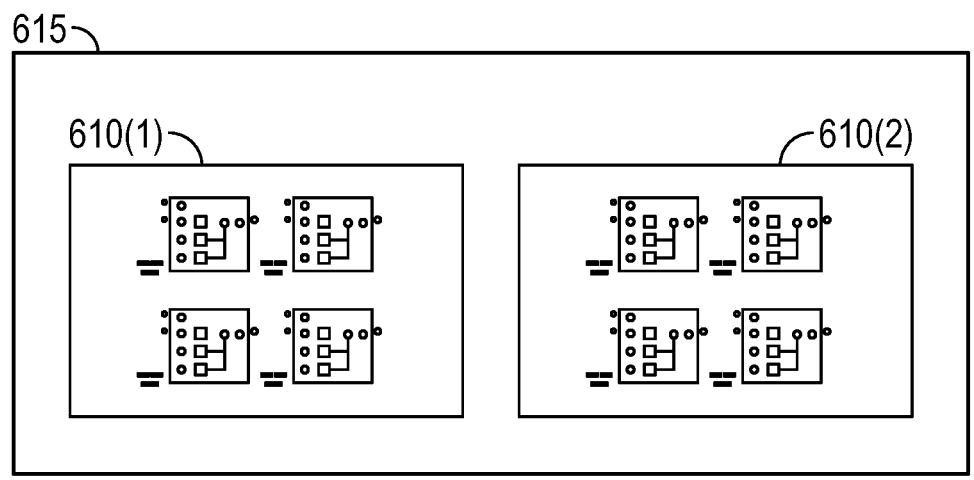

FIGS. 6A and 6B illustrate example nonlinear filters 605, 615 with multiple nonlinear filter circuits grouped together, according to some examples. In some examples, the nonlinear filters 605, 615 can group multiple non-linear filter circuits to form mini-nonlinear filters 610(1), (610(2), 610(3), and 610(4) (collectively referred to as mini nonlinear filters 610 or individually as mini nonlinear filter 610). Each of the mini-nonlinear filters 610 include multiple nonlinear filter circuits (e.g., nonlinear filter circuit 300 in FIG. 3A, the nonlinear filter circuit 350 in FIG. 3B, the nonlinear filter circuit 400 in FIG. 4). By grouping nonlinear filter circuits together to form mini-nonlinear filters 610 as illustrated in FIGS. 6A and 6B, the nonlinear filters 605, 615 can easily add and/or reduce capacity based on different applications, and the nonlinear filters 605, 615 can be more suitable for heterogeneous architectures. For example, the configurable hardware of the nonlinear filters 605, 615 can add, reduce, or combine nonlinear filter circuits based on the application of the nonlinear filters 605, 615 and/or based on the architecture of the nonlinear filters 605, 615. The ability to add, reduce, and/or combine nonlinear filter circuits allows for heterogeneous architectures, such as those shown in FIGS. 6A-6B, 7A-7D, and 8A-8B showing different arrangements and combinations of nonlinear filter circuits.

FIG. 7A-D illustrate examples of nonlinear filter arrangements, according to some examples. In some examples, the nonlinear filters are hardened circuitry and do not include programmable logic, and the arrangements include configurable hardware circuitry at the inputs and/or outputs of the nonlinear filters as needed based on the end application of the pre-distorter circuit. The nonlinear filter arrangements of FIG. 7A-D can be used with a single phase or multiple phases: FIG. 7A illustrates a nonlinear filter arrangement 701 for a single phase, FIG. 7B illustrates a nonlinear filter arrangement 702 for a dual phase, FIG. 7C illustrates a nonlinear filter arrangement 703 for three phases, and FIG. 7D illustrates a nonlinear filter arrangement for four phases. Each of the nonlinear filter arrangements 701, 702, 703, 704 in FIG. 7A-D includes two nonlinear filters 710(1), 710(2) in different arrangements. However, other nonlinear filter arrangements can include any number of nonlinear filters, and correspondingly, the nonlinear filters can include any number of nonlinear filter circuits. Each nonlinear filter 710(1), 710(2) can be independent. In some examples, the nonlinear filters 710(1), 710(2) can be linked directly to the output of the pre-distorter (e.g., the pre-distorter circuit 120) or can be combined with other nonlinear filters or the outputs thereof. For example, the nonlinear filter arrangement 701 of FIG. 7A shows the outputs of the nonlinear filters 710(1), 710(2) being combined together in an adder 715, and the output of the adder 715 would be outputted from the pre-distorter. Further, the resources for each nonlinear filter and for the nonlinear filter arrangement can be scaled depending on the applications.

In one example, as illustrated in FIG. 7A, the nonlinear filter arrangement 701 includes two nonlinear filters 710(1), 710(2), a delay circuit 705, and an adder 715. In such nonlinear filter arrangement 701, the input signal is sent to one of the nonlinear filters 710(1), 710(2) and to the delay circuits 705. After delaying the input signal, the delay circuit 705 sends the delayed input signal to the other of the nonlinear filters 710(1), 710(2) for processing. The outputs of the nonlinear filters 710(1), 710(2) are then accumulated via the adder circuit 715 before being outputted from the pre-distorter circuit (e.g., pre-distorter circuit 120).

In one example, as illustrated in FIG. 7B, the nonlinear filter arrangement 702 includes two nonlinear filters 710(1), 710(2), a delay circuit 705, and an adder 715. In such nonlinear filter arrangement 702, the arrangement 702 receives two input signals, each of which is sent to one of the nonlinear filters 710(1), 710(2) and to the delay circuit 705. After delaying both input signals, the delay circuit 705 sends both delayed input signals to the other of the nonlinear filters 710(1), 710(2) for processing. The outputs of the nonlinear filters 710(1), 710(2) are then accumulated via the adder circuit 715 before being outputted from the pre-distorter circuit as two output signals. In such example, the two input signals can be the same input signal offset by phase.

In one example, as illustrated in FIG. 7C, the nonlinear filter arrangement 703 includes two nonlinear filters 710(1), 710(2). In such nonlinear filter arrangement 703, the arrangement 703 receives three input signals, each of which are sent to each of the nonlinear filters 710(1), 710(2), and one of the nonlinear filters 710(1), 710(2) outputs two output signals and the other nonlinear filter outputs one output signal. The output signals from the nonlinear filters 710(1), 710(2) can be offset from each other and from the other output(s) from the other nonlinear filter. By using multiple nonlinear filters, the arrangement can be used to generate three or four phase designs (FIG. 7C and FIG. 7D respectively). For example the arrangement 703 can be used for Macro, when the signal bandwidth is over 300 MHz and the required DPD sample rate is more than 1.5 GHz.

In one example, as illustrated in FIG. 7D, the nonlinear filter arrangement 704 includes two nonlinear filters 710(1), 710(2). In such nonlinear filter arrangement 704, the arrangement 704 receives four input signals, each of which are sent to each of the nonlinear filters 710(1), 710(2). Each of the nonlinear filters 710(1), 710(2) then processes the input signals and generates two output signals that are phase-offset from each other. The outputs from the nonlinear filters 710(1), 710(2) can also be phase-offset from each other and from the outputs of the other nonlinear filter.

Figure 8A:
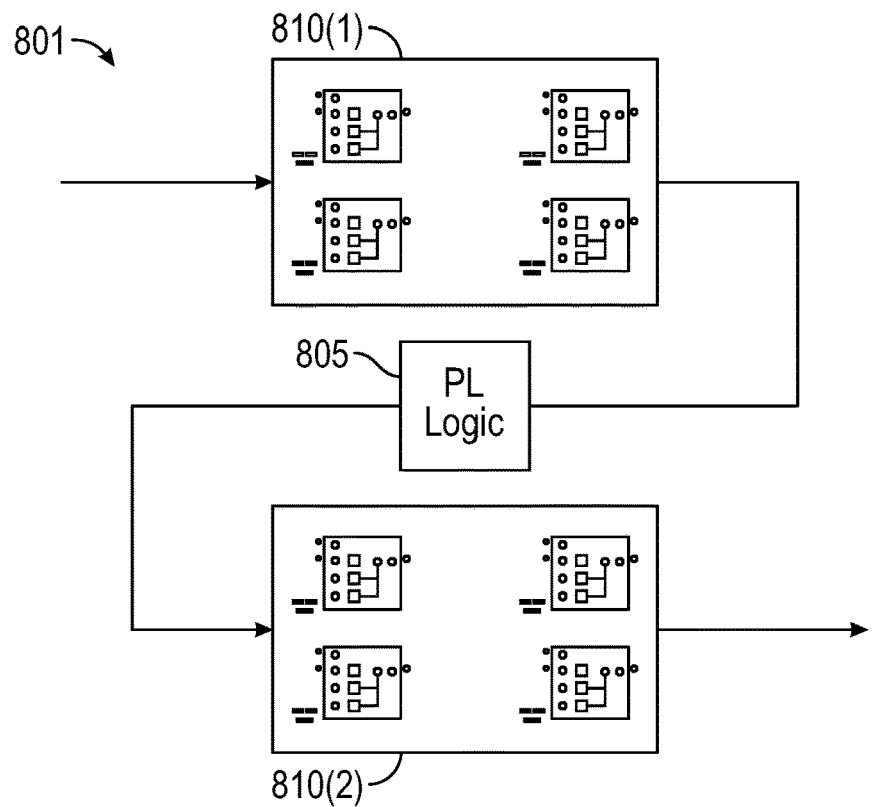
FIGS. 8A and 8B are diagrams of example arrangements of non-linear filters, according to some example.
Figure 8B:
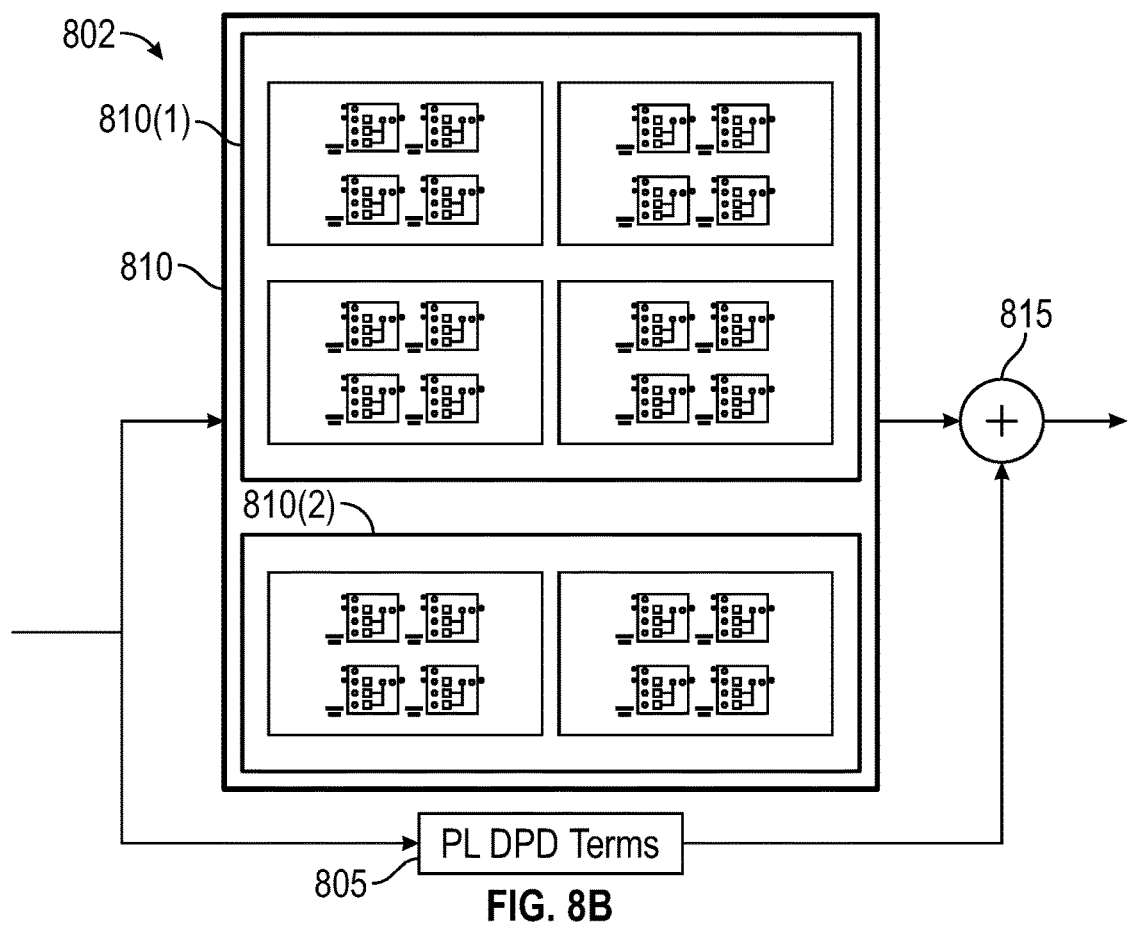

FIGS. 8A and 8B illustrate nonlinear filter arrangements, according to some examples. As mentioned, nonlinear filters can be arranged as needed per the application (e.g., equalizers, low power small cells, applications with signal bandwidth less than 100 MHz) and the application specifications. FIG. 8A illustrates one arrangement 801 of nonlinear filters. In such arrangement 801, the nonlinear filters 810(1), 810(2) are cascaded together, such that the output of one nonlinear filter (e.g., nonlinear filter 810(1)) can be sent to another nonlinear filter (e.g., nonlinear filter 810(2)) or to some circuitry for processing, which then sends the processed output to another nonlinear filter. FIG. 8B illustrates another arrangement 802 of nonlinear filters 810(1), 810(2). In such arrangement, the nonlinear filter 810 can be configured as an equalizer. When the nonlinear filter 810 is configured as an equalizer, the entries in each memory of the nonlinear filter 810 are programmed as the same value and the address bits are tied to fixed location. In some examples, additional hardware circuitry or programmable logic can also be added to implement the nonlinear filters (e.g., nonlinear filters 810) with other functions. For example, as illustrated in FIG. 8B, the additional hardware circuitry or programmable logic is needed to compensate specific long-term nonlinearity, such as for Macro power amplifiers (e.g., gallium nitride (GaN) power amplifiers).

The circuits described herein can be implemented on an integrated circuit or as a device having programmable resources.

While the foregoing is directed to specific examples, other and further examples may be devised without departing from the basic scope thereof, and the scope thereof is determined by the claims that follow.

What is claimed is:

1. A nonlinear filter circuit of a pre-distortion circuit, the nonlinear filter circuit comprising:
one or more adders;
one or more multipliers;
one or more memories coupled to at least one of the one or more adders and the one or more multipliers, wherein the one or more memories stores nonlinear parameters; and
configurable hardware circuitry configured to:
distort one or more input signals by directing the one or more input signals along a path through the one or more adders, the one or more multipliers, and the one or more memories, and by distorting the one or input signals using the nonlinear parameters stored in the one or more memories as the one or more input signals travels the path; and
configure the path by configuring an arrangement of the one or more adders, the one or more multipliers, and the one or memories based on an end application of the pre-distortion circuit.

2. The nonlinear filter circuit of claim 1, wherein the one or more memories comprise one or more lookup tables.

3. The nonlinear filter circuit of claim 1, wherein the one or more adders, the one or more multipliers, and the one or more memories comprise hardened circuitry.

4. The nonlinear filter circuit of claim 1, wherein the configurable hardware circuitry comprises at least one of:
programmable logic; or
multiplexers and switches.

5. The nonlinear filter circuit of claim 4, wherein the multiplexers and switches are configured direct the one or more input signals along the path through the one or more adders, the one or more multipliers, and the one or more memories based on the end application of the pre-distortion circuit.

6. The nonlinear filter circuit of claim 1, wherein the configurable hardware circuitry comprises at least one of:
circuitry for delaying the one or more input signals; and
circuitry for performing mathematical operations on data sent on the one or more input signals.

7. The nonlinear filter circuit of claim 1, wherein the configurable hardware circuitry is configured to direct outputs signals of the one or more adders, the one or more multipliers and the one or more memories to an input of at least one of the one or more adders, the one or more multipliers and the one or more memories.

8. The nonlinear filter circuit of claim 1, wherein the configurable hardware circuitry of the nonlinear filter circuit is reconfigurable to meet requirements of a plurality of end applications.

9. The nonlinear filter circuit of claim 1, wherein:
the one or more memories are coupled to the one or more adders as inputs;
the one or more adders are coupled to the one or more multipliers as a first input;
an input signal is coupled to the one or more multipliers as a second input; and
the nonlinear filter circuit is configured to output an output of the one or more multipliers.

10. A radio frequency circuit, comprising:
a controller;
a parameter estimator circuit;
a capture circuit; and
a pre-distorter circuit, the pre-distorter circuit comprising one or more nonlinear filter circuits, each of the one or more the nonlinear filter circuits comprising:
one or more adders;
one or more multipliers;
one or more memories coupled to at least one of the one or more adders and the one or more multipliers, wherein the one or more memories stores nonlinear parameters; and
configurable hardware circuitry configured to:
distort one or more input signals by directing the one or more input signals along a path through the one or more adders, the one or more multipliers, and the one or more memories and by distorting the one or input signals using the nonlinear parameters stored in the one or more memories as the one or more input signals travels the path; and
configure the path by configuring an arrangement of the one or more adders, the one or more multipliers, and the one or memories based on an end application of the pre-distortion circuit.

11. The radio frequency circuit of claim 10, further comprising control signal inputs coupled to each of the one or more nonlinear filter circuits.

12. The radio frequency circuit of claim 10, wherein the configurable hardware circuitry is configured direct the one or more input signals along the path through the one or more adders, the one or more multipliers, and the one or more memories based on the end application of the pre-distortion circuit.

13. The radio frequency circuit of claim 10, wherein the one or more memories comprise one or more lookup tables.

14. The radio frequency circuit of claim 10, wherein the configurable hardware circuitry comprises one of:
programmable logic; or
multiplexers and switches.

15. The radio frequency circuit of claim 10, wherein the one or more adders, the one or more multipliers, and the one or more memories comprise hardened circuitry.

16. The radio frequency circuit of claim 10, wherein the one or more nonlinear filter circuits receive at least one input signal processed by the configurable hardware circuitry and at least one unprocessed input signal.

17. The radio frequency circuit of claim 10, wherein the configurable hardware circuitry comprises at least one of:
circuitry for delaying the one or more input signals; and
circuitry for performing mathematical operations on data sent on the one or more input signals.

18. The radio frequency circuit of claim 10, wherein the configurable hardware circuitry is configured to add, to reduce, or to combine the one or more nonlinear filter circuits based on an application or an architecture of the pre-distorter circuit.

19. The radio frequency circuit of claim 10, wherein, for each of the one or more the nonlinear filter circuits:
the one or more memories are coupled to the one or more adders as inputs;
the one or more adders are coupled to the one or more multipliers as a first input;
an input signal is coupled to the one or more multipliers as a second input; and
an output of the one or more multipliers is output.

20. A nonlinear filter of a pre-distorter circuit, comprising:
configurable hardware circuitry; and
one or more nonlinear filter circuits, each of the one or more the nonlinear filter circuits comprising:
one or more adders;
one or more multipliers; and
one or more memories coupled to at least one of the one or more adders and the one or more multipliers, wherein the one or more memories stores nonlinear parameters;
wherein the configurable hardware circuitry is configured to:
distort one or more input signals by directing the one or more input signals along a path through the one or more adders, the one or more multipliers, and the one or more memories and by distorting the one or input signals using the nonlinear parameters stored in the one or more memories as the one or more input signals travels the path; and
configure the path by configuring an arrangement of the one or more adders, the one or more multipliers, and the one or memories based on an end application of the pre-distortion circuit.

* * * * *